United States Patent
Nesvadba et al.

(10) Patent No.: US 7,023,917 B2
(45) Date of Patent: Apr. 4, 2006

(54) DETECTING SUBTITLES IN A VIDEO SIGNAL

(75) Inventors: Jan Alexis Daniel Nesvadba, Eindhoven (NL); Wilhelmus Hendrikus Alfonsus Bruls, Eindhoven (NL); Gerardus Johannes Maria Vervoort, Eindhoven (NL); Bernhard Hubert Penz, Eitweg (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 857 days.

(21) Appl. No.: 10/144,531

(22) Filed: May 13, 2002

(65) Prior Publication Data
US 2003/0021342 A1    Jan. 30, 2003

(30) Foreign Application Priority Data
May 15, 2001  (EP)  ................................. 01201779

(51) Int. Cl.
H04N 7/12       (2006.01)
H04N 11/02      (2006.01)
G06K 9/36       (2006.01)

(52) U.S. Cl. ................. 375/240.03; 382/176; 382/292

(58) Field of Classification Search ........... 375/240.01, 375/240.03, 240.25; 348/465, 468, 564, 348/569; 382/176, 292
See application file for complete search history.

(56) References Cited

U.S. PATENT DOCUMENTS 6,101,274 A * 8/2000 Pizano et al. ............... 382/176
6,243,419 B1 * 6/2001 Satou et al. ........... 375/240.13

FOREIGN PATENT DOCUMENTS

WO   WO9501051   1/1995

OTHER PUBLICATIONS

'Efficient MPEG compressed video analysis using macroblock type information'; Soo-Chang Pei; Yu-Zuong Chou; Multimedia, IEEE Transactions on vol. 1, Issue 4, Dec. 1999 Page(s):321-333.*

* cited by examiner

Primary Examiner—Gims Philippe
Assistant Examiner—Erick Rekstad

(57) ABSTRACT

A method and arrangement (300) are disclosed for detecting the presence, appearance or disappearance of subtitles in a video signal. A very high reliability can be achieved, and a marginal processing power is needed, due to the fact that most computations are already done by circuitry of an MPEG encoder (101–113) or decoder. A subtitle is detected if the complexity of the image area in which subtitles are displayed substantially exceeds the complexity of at least one other image area. Examples of properties representing the complexity are (i) the products of bit cost (b) and quantizer scale (qs) in MPEG slices, (ii) the location of the center of gravity of the spectral DCT coefficients (c), (iii) the number of macroblocks in the subtitle image area having a small motion vector (mv) versus the number of macroblocks having a large motion vector, or (iv) the fact that scene changes are not simultaneously detected in the different image areas.

The arrangement can be used for commercial break detection or keyframe generation.

6 Claims, 5 Drawing Sheets

DETECTING SUBTITLES IN A VIDEO SIGNAL

FIELD OF THE INVENTION

The invention relates to a method and arrangement for detecting subtitles in a video signal.

BACKGROUND OF THE INVENTION

A known method of detecting subtitles in a video signal is disclosed in International Patent Application WO-A 95/01051. In this prior-art method, the number of signal level transitions in a television line is counted. The detection is based on the insight that subtitles are normally light characters on a dark background.

OBJECT AND SUMMARY OF THE INVENTION

It is an object of the invention to provide an alternative method and arrangement for detecting subtitles.

To this end, the method in accordance with the invention divides each frame into a first image area in which subtitles are expected to be reproduced and at least one second image area not coinciding with said first image area, and calculates a complexity of the first and second image areas. An output signal is generated if the complexity of the first image area exceeds the complexity of the second image area by a predetermined ratio.

Embodiments of the method and arrangement have the advantage that existing circuitry of MPEG encoders and/or decoders can be used. The processing power to detect the subtitles is marginal, due to the fact that most computations are already done by circuitry in the video encoder or decoder.

One embodiment is based on MPEG division of frames into slices each encoded into a number of bits and a quantizer scale. The complexities of the first and second image areas are herein calculated by summing the products of said number of bits and quantizer scale over the slices constituting the respective image area.

A further embodiment is based on the transformation of image data into spectral DC and AC coefficients. The complexity of the first and second image areas is represented by the center of gravity of the spectral coefficients.

Another embodiment is based on MPEG division of frames into blocks having motion vectors. The complexity of the first image area is represented by the number of blocks having a motion vector which is smaller than a predetermined first threshold, and the complexity of the second image area is represented by the number of blocks having a motion vector which is larger than a predetermined second threshold.

In yet another embodiment, the motion estimation circuitry of an MPEG decoder to search resembling prediction blocks is used to detect scene changes. The complexities of the first and second image areas are herein represented by the occurrence of a scene change in the respective image area, and the output signal is generated if a scene change is detected in said first image area and not in said second image area. Note that, in this embodiment, the output signal indicates the appearance or disappearance of a subtitle rather than its presence.

The detection of subtitles is useful in various kinds of video signal processing.

The subtitle may be subjected to an OCR algorithm to provide an electronic version of the text. The electronic text may be separately stored and subsequently used, for example, for indexing video scenes stored in a database. A typical application thereof is retrieval of video scenes in a video recorder based on spoken keywords.

A further application is the generation of key frames for retrieval or editing of video material. A key frame is usually one of the first frames after a scene change. The invention allows subtitled frames to be selected as key frames.

Subtitle detection may further assist in detecting commercial breaks in television programs. Because commercials are rarely subtitled, the absence of subtitles for a certain period of time during a subtitled movie is an indication of a commercial break.

DESCRIPTION OF EMBODIMENTS

Figure 1:
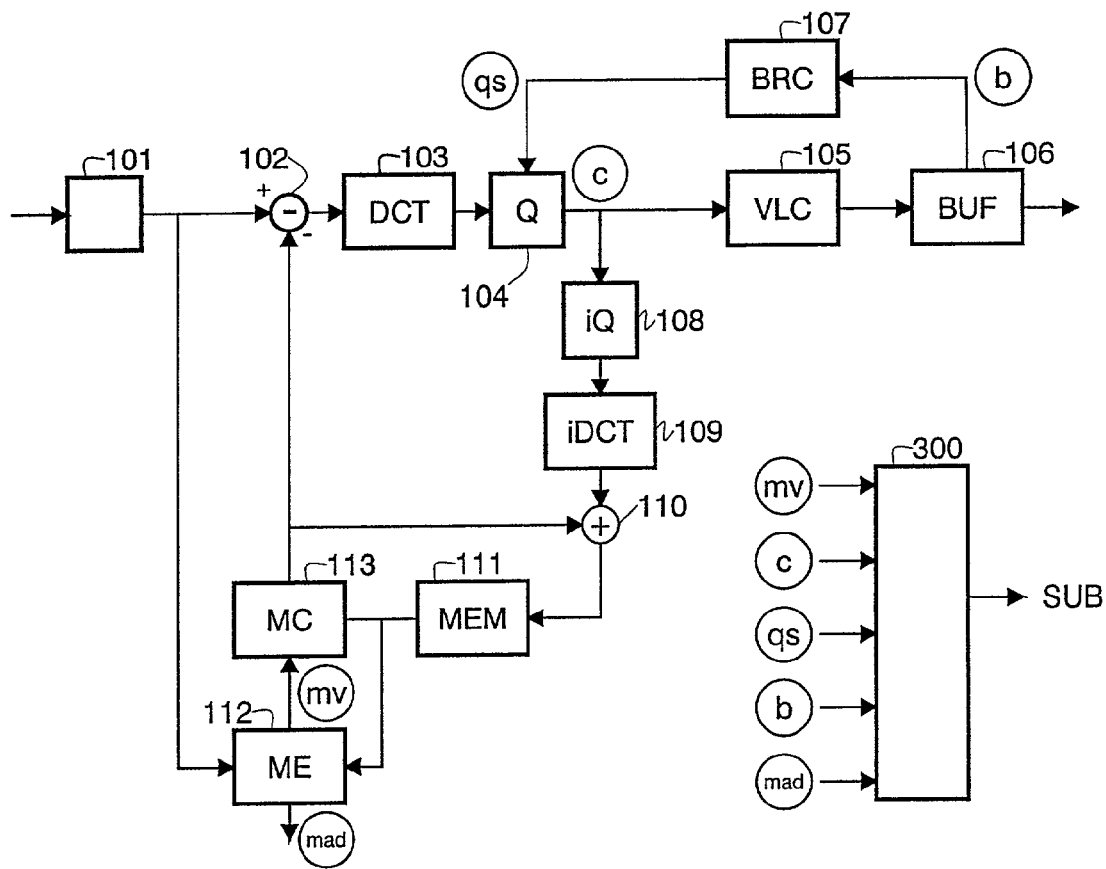
FIG. 1 shows schematically an MPEG encoder including a subtitle detector in accordance with the invention.

FIG. 1 shows schematically an MPEG encoder including an arrangement for detecting a subtitle in accordance with the invention. The MPEG encoder is known per se. It comprises a circuit 101 for dividing each input image into blocks, a subtractor 102 for subtracting a prediction block from each block, a Discrete Cosine Transform circuit 103 which transforms each block of 8×8 image pixels into blocks of 8×8 spectral coefficients, a quantizer 104, a variable-length encoder 105, a buffer 106, a bit rate control circuit 107, an inverse quantizer 108, an inverse Discrete Cosine Transform circuit 109, an adder 110, a frame memory 111, a motion estimation circuit 112, and a motion compensator 113. The operation of the MPEG encoder is well known to the skilled person in the field of video compression and will therefore not be described in more detail. An exhaustive description can be found, inter alia, in the book "MPEG Video Compression Standard" by J. L. Mitchel et al., ISBN 0-412-08771-5Kluwer Academic Publishers.

Reference numeral 300 in FIG. 1 denotes the subtitle detector. Various embodiments thereof will be described hereinafter. The detector receives input signals produced by the MPEG encoder. The actual signal (or set of signals) being fed to the detector depends on the embodiment. Five input signals are shown in FIG. 1 by means of encircled signal names:

b denotes the number of bits used for encoding an image slice excluding overhead bits, qs denotes the quantizer scale for a slice, c denotes the transform coefficients (DC and AC) of a macroblock, mv denotes the motion vector(s) of a macroblock, mad denotes the mean absolute difference between an input image block and the prediction block found by the motion estimator.

Figure 2:
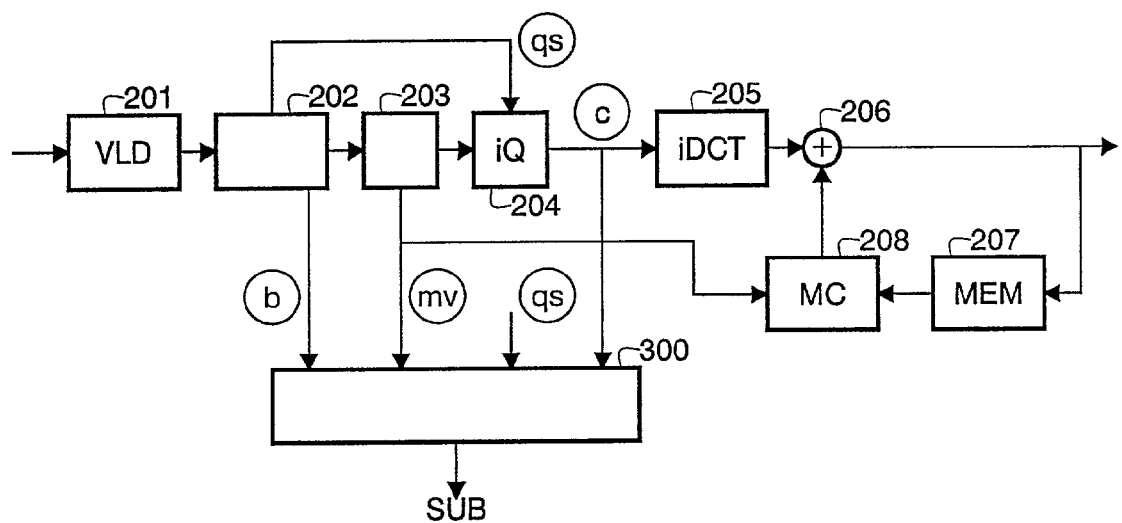
FIG. 2 shows schematically an MPEG decoder including a subtitle detector in accordance with the invention.

FIG. 2 shows an MPEG decoder, comprising a variable-length decoder 201, a slice processor 202, a macroblock processor 203, an inverse quantizer 204, an inverse Discrete Cosine Transformer 205, an adder 206, a frame memory 207, and a motion compensator 208. Like the encoder, a further description of this MPEG decoder does not need to be given here. Reference numeral 300 again denotes the subtitle detector, which receives input signals from various parts of the MPEG decoder. The signals b, mv, qs and c in FIG. 2 are the same as in FIG. 1.

Figure 3:
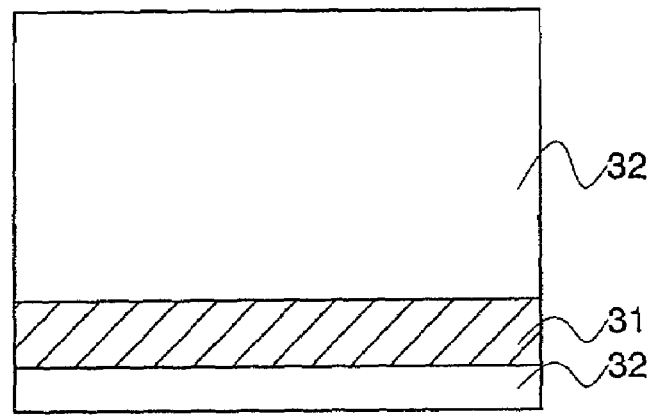
FIG. 3 shows an image divided into image areas.

The operation of the subtitle detector 300 will now be described. As FIG. 3 shows, the detector splits the display screen into a first image area 31, in which subtitles are usually displayed, and further image areas 32. The first image area 31 and further image areas 32 will hereinafter also be referred to as subtitle area and non-subtitle area, respectively. The subtitle detection algorithm is based on the significant difference between the complexity of the second image area, where no subtitles appear, and the complexity of the first image area where subtitles are displayed.

Figure 4:
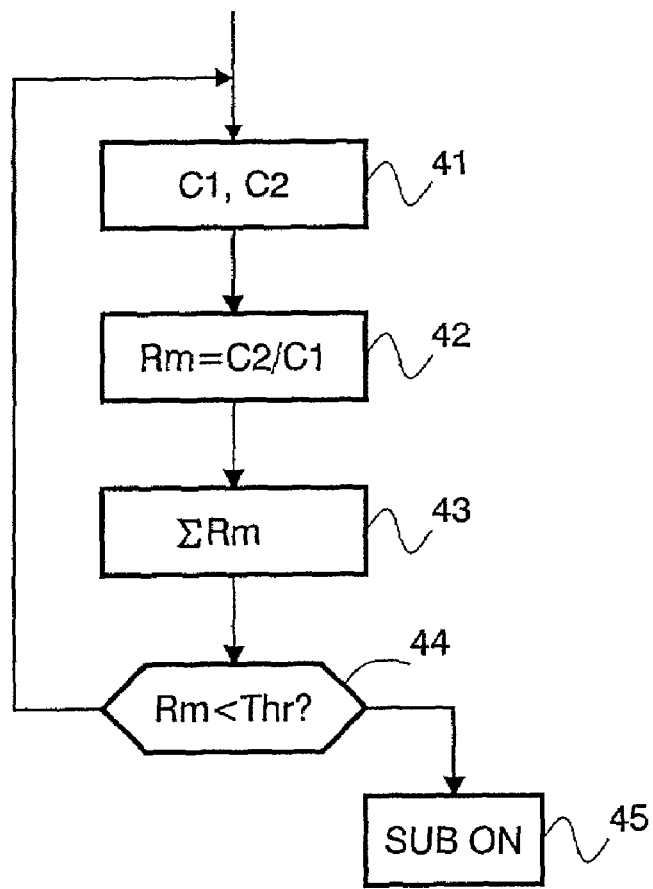
FIG. 4 is a flow chart of operational steps carried out by a first embodiment of the subtitle detector which is shown in FIGS. 1 and 2.

FIG. 4 is a flow chart of operational steps carried out by a first embodiment of the subtitle detector 300. In this embodiment, the complexity is represented by the product of the number of bits b used to encode the respective image area and the quantizer scale qs. For the subtitle area, the complexity $C_1$ is:

$$C_1 = \sum_{S_1} b \times qs$$

where $S_1$ denotes the set of slices collectively forming the subtitle area. For the non-subtitle area, the complexity $C_2$ is:

$$C_2 = \sum_{S_2} b \times qs$$

where $S_2$ denotes the set of slices collectively forming the non-subtitle area. In order to take the different sizes of the two areas into account, the complexities $C_1$ and $C_2$ can be normalized by dividing them by the number of macroblocks the areas cover. The complexities $C_1$ and $C_2$ are calculated in a step 41.

In a step 42, the ratio $R_m = C_2/C_1$ for the current frame m is computed. Rm is low when a subtitle is present in the frame. If no subtitle is present, the complexities of the two areas are comparable and therefore match. The structure of a subtitle (usually white fonts, surrounded by a small black line), and the additional fact that it is overlaid in the original frame, causes the complexity values of the subtitle area to rise significantly. The ratio $R_m$ will therefore decrease. The lower the ratio, the bigger and more complex the subtitle.

A two-hour examination of available subtitled material revealed that the minimum duration of a subtitle in a movie is two seconds. The detector calculates the ratio $R_m$ for each I frame produced within said time period.

In a subsequent step 43, the ratios $R_m$ are summed up. In a step 44, $\Sigma R_m$ is compared with a threshold Thr. A subtitle is said to be present, and an appropriate output signal is generated in a step 45, if $\Sigma R_m$ is lower than said threshold. The threshold Thr is chosen empirically from examination of available subtitled movie material.

Figure 5:
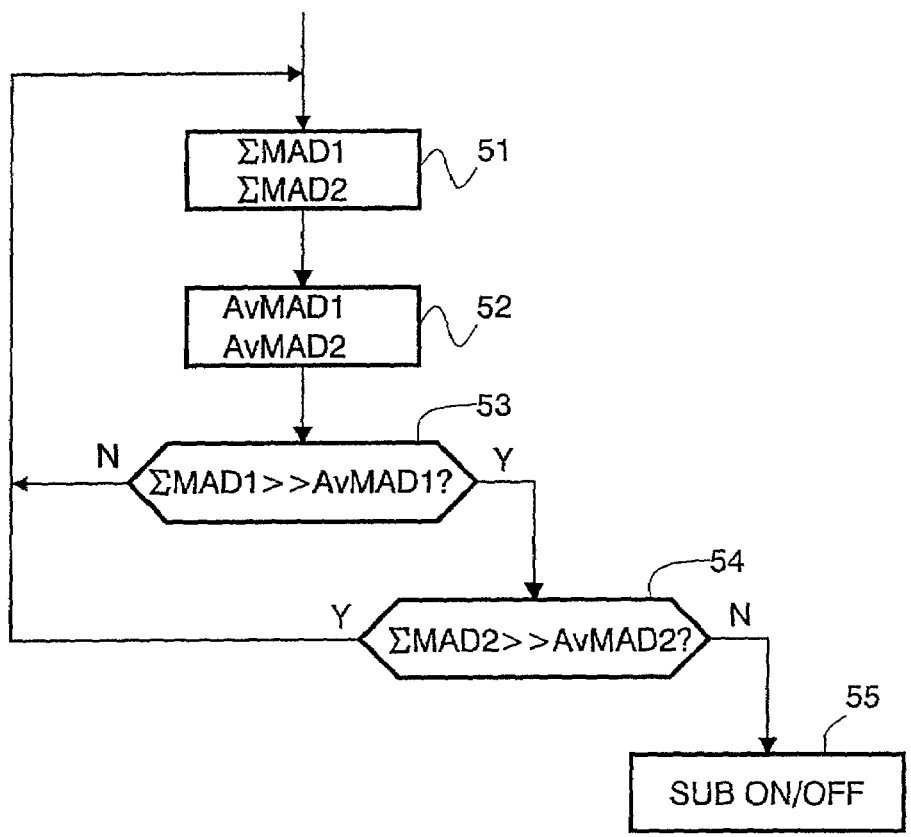
FIG. 5 is a flow chart of operational steps carried out by a second embodiment of the subtitle detector which is shown in FIGS. 1 and 2.
Figure 6:
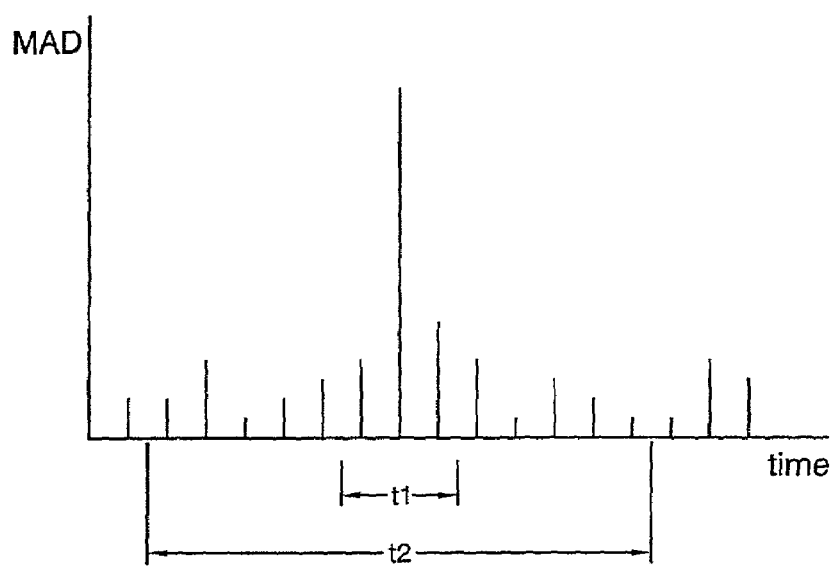
FIG. 6 shows a timing diagram to illustrate the operation of the embodiment which is shown in FIG. 5.

FIG. 5 is a flow chart of operational steps carried out by a second embodiment of the subtitle detector 300. In this embodiment, the complexity is represented by the occurrence of a scene change in the respective image areas 31 and 32. To this end, the subtitle detector receives the mean absolute distortion (mad) of a current macroblock from the MPEG encoder. The mean absolute distortion MAD is a criterion used by the encoder to locate, in the frame memory 111 (see FIG. 1), an image block which most resembles the current input block, and selects said block to be used as prediction block for predictive encoding. In a first step 51, the detector 300 computes the sum $\Sigma MAD_1$ of the mean absolute distortions in the subtitle area for the actual frame, and the sum $\Sigma MAD_2$ of the mean absolute distortions in the non-subtitle area. In a step 52, the detector computes the average values $AvMAD_1$ and $AvMAD_2$ for all the frames (I, P and B) inside a first given timing window $t_1$, around the actual frame, excluding frames which are inside a smaller timing window $t_2$ around the frame (see FIG. 6). In a step 53, the sum $\Sigma MAD_1$ of the actual frame is compared with the average value $AvMAD_1$ of the frames within the timing window. If the sum $\Sigma MAD_1$ is substantially higher than the average value $AvMAD_1$ the sum $\Sigma MAD_1$, is a local peak value. In that case, a scene change has been detected in the subtitle area. In a similar manner, the sum $\Sigma MAD_2$ is compared with the average value $AvMAD_2$ in a step 54. If $\Sigma MAD_2$ is substantially higher than $AvMAD_2$, the sum $\Sigma MAD2$ is a local peak value and a scene change has been detected in the non-subtitle area. If a scene change has been detected in the subtitle area but not in the non-subtitle area, the actual frame is indexed as that of a subtitle appearance or disappearance. An output signal is then generated in a step 55.

Figure 7:
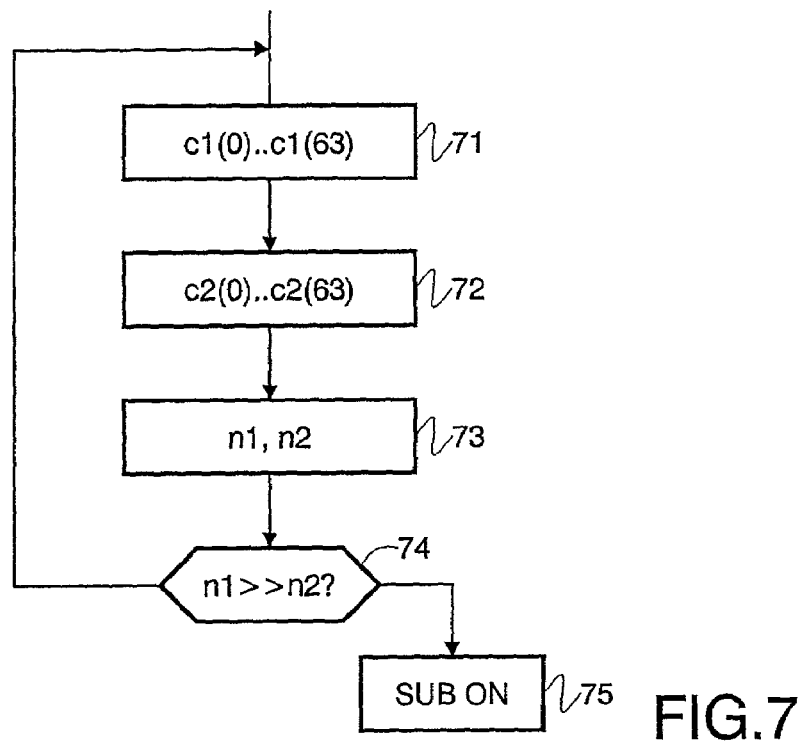
FIG. 7 is a flow chart of operational steps carried out by a third embodiment of the subtitle detector which is shown in FIGS. 1 and 2.

FIG. 7 is a flow chart of operational steps carried out by a third embodiment of the subtitle detector 300. In this embodiment, the complexity is represented by the 'center of gravity' of the DCT coefficients c produced by the encoder or received by the decoder. In a step 71, a histogram of the DCT coefficients $c_1(0) \ldots c_1(63)$ of the blocks forming the subtitle area is computed. Advantageously, this is done for I frames only. In a step 72, the same histogram is computed for the DCT coefficients $c_2(0) \ldots c_2(63)$ of the blocks forming the non-subtitle area. In a step 73, the respective centers of gravity $n_1$ and $n_2$ are computed. The center of gravity is the index n of the DCT coefficient for which:

$$\sum_{i=0}^{n} c(i) = \sum_{i=n+1}^{63} c(i)$$

Figure 8A:
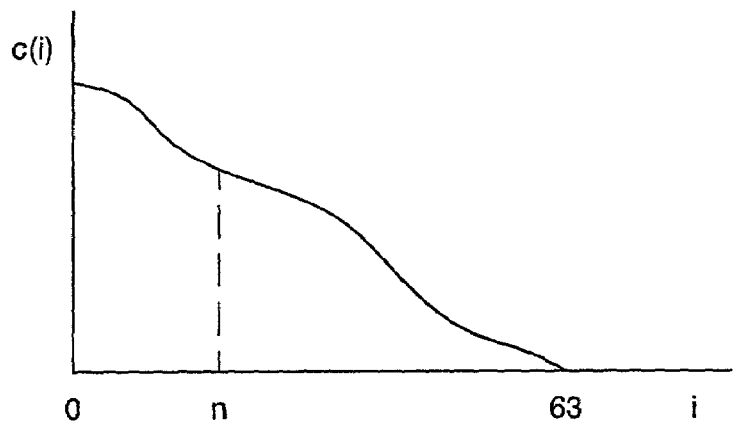
FIGS. 8A and 8B show histograms to illustrate the operation of the embodiment which is shown in FIG. 7.
Figure 8B:
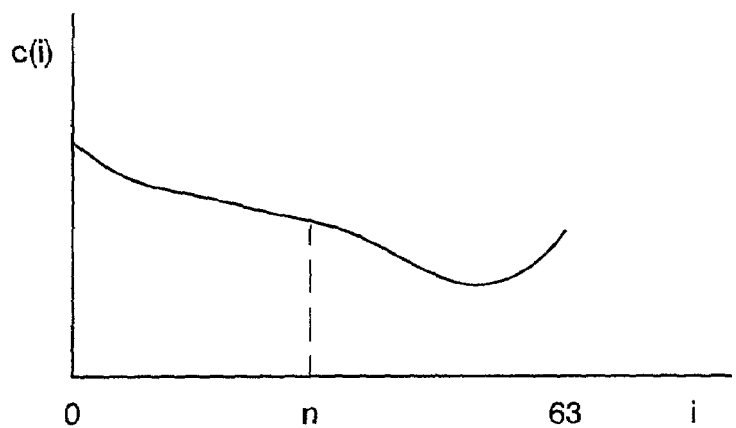

This is illustrated in FIGS. 8A and 8B, where FIG. 8A shows a histogram which is typical of image areas without a subtitle, and FIG. 8B shows a histogram which is typical of image areas with a subtitle. This is caused by the fact that subtitles are usually white with a small black border so that the blocks covering subtitles contain a larger number of high AC coefficients.

In a step 74, the centers of gravity $n_1$ and $n_2$ are compared. If the center $n_1$ corresponds to a substantially higher spatial frequency than the center $n_2$, the actual I frame is detected to be a subtitle frame. In that case, an output signal is generated in a step 75.

Figure 9:
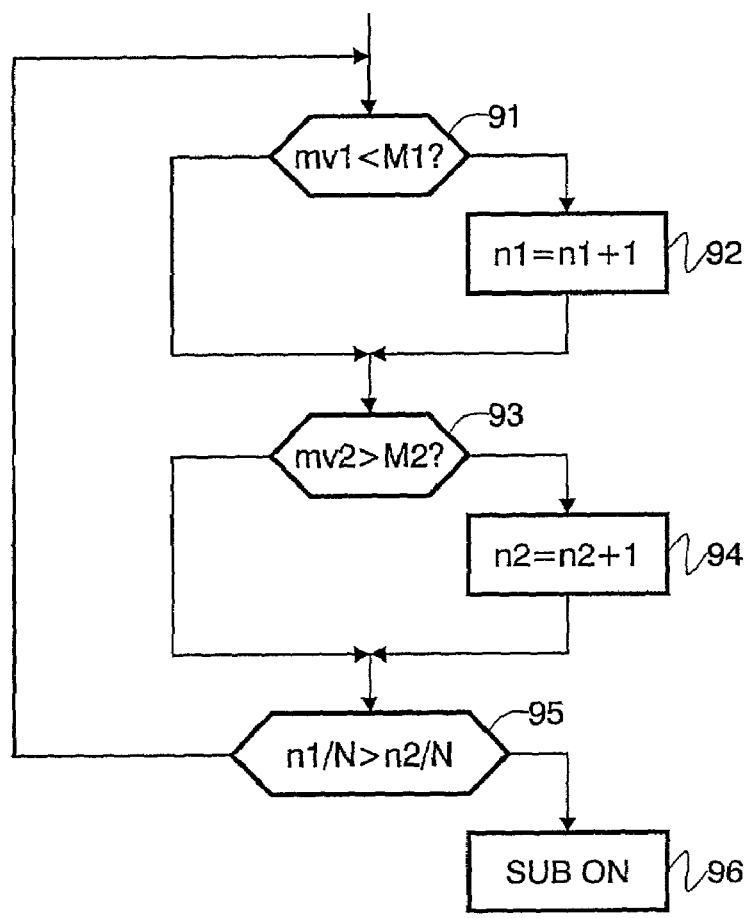
FIG. 9 is a flow chart of operational steps carried out by a fourth embodiment of the subtitle detector which is shown in FIGS. 1 and 2.

FIG. 9 is a flow chart of operational steps carried out by a forth embodiment of the subtitle detector 300. In this embodiment, the complexity is derived from the motion vectors mv produced by the encoder or received by the receiver. In a step 91, it is checked whether the motion vectors $mv_1$ of inter-macroblocks forming the subtitle area are smaller than a given value $M_1$. In that case, a counter $n_1$ is incremented in a step 92. In a step 93, it is checked whether the motion vectors $mv_2$ of the inter-macroblocks forming the non-subtitle area are larger than a given value $M_2$. In that case, a counter $n_2$ is incremented in a step 94.

Figure 10:
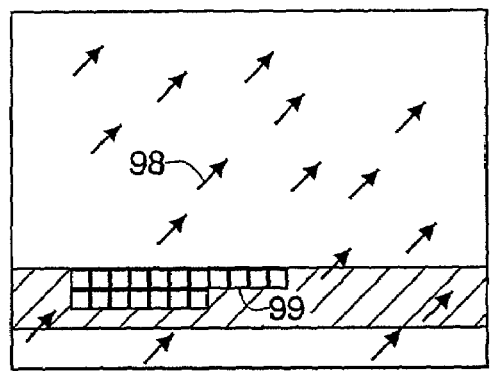
FIG. 10 shows an image illustrating the embodiment of FIG. 9.

In a step 95, the detector checks whether the average number $n_1/N_1$ of small motion vectors in the subtitle area exceeds the average number $n_2/N_2$ of large motion vectors in the non-subtitle area, where $N_1$ and $N_2$ are the total number of macroblocks in the subtitle area and non-subtitle area, respectively. If that is the case, a subtitle is said to be present, and an appropriate output signal is produced in a step 96. This embodiment exploits the insight that subtitles are static so that the motion vectors in the subtitle area are generally small. This is illustrated in FIG. 10, where numerals 98 an 99 denote macroblocks having large motion vectors and macroblocks having small (approximately zero) motion vectors, respectively.

A subtitle can also be detected by determining, for each (8×8) block of an image, whether such block is likely a "text block", and subsequently identifying a subtitle as an area which accommodates a significant number of contiguous text blocks. A possible text block detection algorithm includes calculating the absolute sum of a given set of AC coefficients, and checking said absolute sum against a threshold Thr. In mathematical notation:

$$TB(x, y) = \begin{cases} 1 & \text{if } \sum_{i,j \in I,J} |AC_{x,y}(i, j)| > Thr \\ 0 & \text{if } \sum_{i,j \in I,J} |AC_{x,y}(i, j)| \leq Thr \end{cases}$$

where x,y denotes the position of a block within an image, i,j denotes the position of AC coefficients within the block, and I,J denotes the coefficient positions that are taken into account for text detection (for example, the first nine AC coefficients of a zigzag scan).

The text block detection values TB(x,y) thus obtained collectively constitute a matrix containing 1's for possible text blocks and 0's otherwise. The text block matrix will generally include a significant number of 1's in the subtitle area. The matrix will also include isolated text blocks elsewhere in the image due to sharp luminance edges, and isolated non-text blocks in the subtitle area due to misdetection or spaces between words of the subtitle. Therefore, filtering is applied to the result of the text block detection. A first filter is used to remove isolated text blocks. A second filter is used to close the gaps between text blocks. It has been found that the sequence remove-close-remove-close (two iterative filter operations) are adequate. More iterations do not improve the result significantly. The filter size may be adjusted to the font size that is used by the respective image provider and may therefore vary from country to country or from broadcasting station to broadcasting station.

The subtitle localization using the text block matrix can further be improved by taking known geometric properties into account such as aspect ratio (subtitles are usually stretched horizontally) and position (lower third of the screen). Also temporal properties (subtitles are static for a certain period of time) may be taken into account by such post-processing algorithm.

A method and an arrangement (300) for detecting the presence, appearance or disappearance of subtitles in a video signal are disclosed. A very high reliability can be achieved, and a marginal processing power is needed, due to the fact that most computations are already done by circuitry of an MPEG encoder (101–113) or decoder. A subtitle is detected if the complexity of the image area in which subtitles are displayed substantially exceeds the complexity of at least one other image area. Examples of properties representing the complexity are (i) the products of bit cost (b) and quantizer scale (qs) in MPEG slices, (ii) the location of the center of gravity of the spectral DCT coefficients (c), (iii) the number of macroblocks in the subtitle image area having a small motion vector (mv) versus the number of macroblocks having a large motion vector, or (iv) the fact that scene changes are not simultaneously detected in the different image areas.

The arrangement can be used for commercial break detection or keyframe generation.

The invention claimed is:

1. A method of detecting subtitles in a video signal, the method comprising the steps of:
dividing each frame into a first image area in which subtitles are expected to be reproduced and at least one second image area not coinciding with said first image area;
calculating a complexity of the first and second image areas;
generating an output signal if the complexity of the first image area exceeds the complexity of the second image area by a predetermined ratio.

2. A method as claimed in claim 1, wherein the first and second image areas are divided into slices each encoded into a number of bits and a quantizer scale, the complexity of the first and second image areas being calculated by summing the products of said number of bits and quantizer scale over the slices constituting the respective image area.

3. A method as claimed in claim 1, wherein the image data in each image area are transformed into spectral coefficients, the method further comprising the step of calculating the center of gravity of the spectral coefficients of the respective image area, the complexity of the first and second image areas being represented by the spectral location of the respective center of gravity.

4. A method as claimed in claim 1, wherein the first and second image areas are divided into blocks having motion vectors, the complexity of the first image area being represented by the number of blocks having a motion vector which is smaller than a predetermined first threshold, and the complexity of the second image area being represented by the number of blocks having a motion vector which is larger than a predetermined second threshold.

5. A method as claimed in claim 1, further comprising the steps of detecting a scene change in said first and second image areas, wherein the complexity of the first and second image area is represented by the occurrence of a scene change in the respective image area, and the output signal is generated if a scene change is detected in said first image area and not in said second image area.

6. An arrangement for detecting subtitles in a video signal, the arrangement comprising:

means for dividing each frame into a first image area in which subtitles are expected to be reproduced and at least one second image area not coinciding with said first image area;

means for calculating a complexity of the first and second image areas;

means for generating an output signal if the complexity of the first image area exceeds the complexity of the second image area by a predetermined ratio.

* * * * *